(12) United States Patent
Wrolstad et al.

(10) Patent No.: US 8,871,136 B2
(45) Date of Patent: Oct. 28, 2014

(54) METHODS FOR MANUFACTURING A CATHETER USING AN ALUMINUM NITRIDE BONDING APPARATUS

(71) Applicant: Abbott Cardiovascular Systems, Inc., Santa Clara, CA (US)

(72) Inventors: David K. Wrolstad, Yucaipa, CA (US); Justin K. Mann, Murieta, CA (US)

(73) Assignee: Abbott Cardiovascular Systems, Inc., Santa Clara, CA (US)

( * ) Notice: Subject to any disclaimer, the term of this patent is extended or adjusted under 35 U.S.C. 154(b) by 0 days.

(21) Appl. No.: 13/791,869

(22) Filed: Mar. 8, 2013

(65) Prior Publication Data
US 2014/0251536 A1 Sep. 11, 2014

(51) Int. Cl.
*B29C 71/04* (2006.01)
*B29C 65/02* (2006.01)

(52) U.S. Cl.
CPC ...................................... *B29C 65/02* (2013.01)
USPC ........................................................ 264/528

(58) Field of Classification Search
CPC combination set(s) only.
See application file for complete search history.

(56) References Cited

U.S. PATENT DOCUMENTS

| | | |
|---|---|---|
| 4,636,272 A | 1/1987 | Riggs |
| 2006/0289112 A1 | 12/2006 | Holman et al. |
| 2007/0114701 A1 | 5/2007 | Stenzel |
| 2008/0086110 A1* | 4/2008 | Galdonik et al. ............. 604/509 |
| 2010/0025894 A1* | 2/2010 | Kleiner et al. ................ 264/528 |

FOREIGN PATENT DOCUMENTS

| | | | | |
|---|---|---|---|---|
| JP | 2001009039 A | * | 1/2001 | ............... A61B 1/00 |
| WO | WO2005097471 | | 10/2005 | |

OTHER PUBLICATIONS

PCT/US2014/022098, mailed Jul. 1, 2014, International Search Report and Written Opinion.

* cited by examiner

*Primary Examiner* — Jeff Aftergut
*Assistant Examiner* — Jaeyun Lee
(74) *Attorney, Agent, or Firm* — Workman Nydegger; John Kwok

(57) ABSTRACT

Apparatuses and methods for joining one or more tubing sections together to form a tubular catheter device, for shaping one or more tubular sections of a catheter device, and/or for fusing elements (e.g., a radiopaque marker) onto a portion of the catheter. Each section of the catheter is typically fabricated independently from the other sections. Subsequently, the separate sections are fused together to form the catheter. The methods described herein allow the various sections of the catheter to be fitted together for fabrication without the use of heat-shrink tubing. The fitted parts are clamped in a die or mold at a temperature at or near room temperature; the die is then rapidly heated to fuse the parts, rapidly cooled back down to a temperature at or about room temperature, and removed from the die.

28 Claims, 9 Drawing Sheets

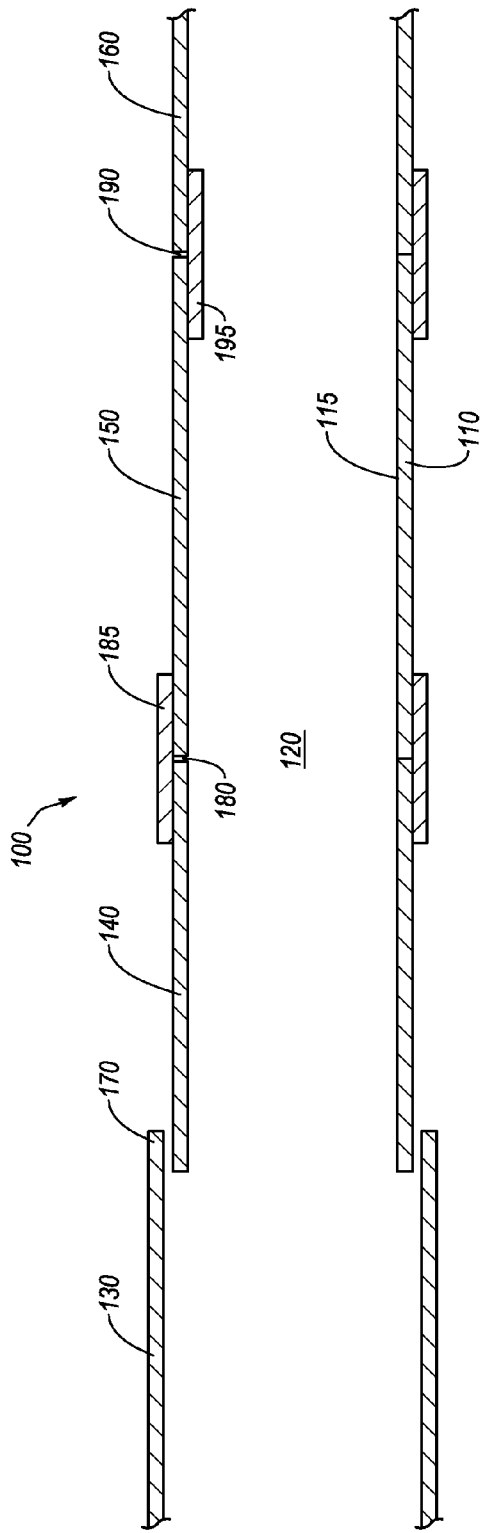
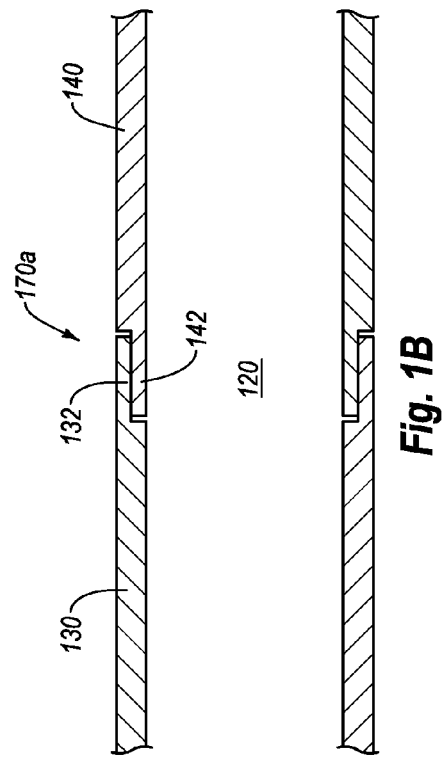
Fig. 1A
Fig. 1B

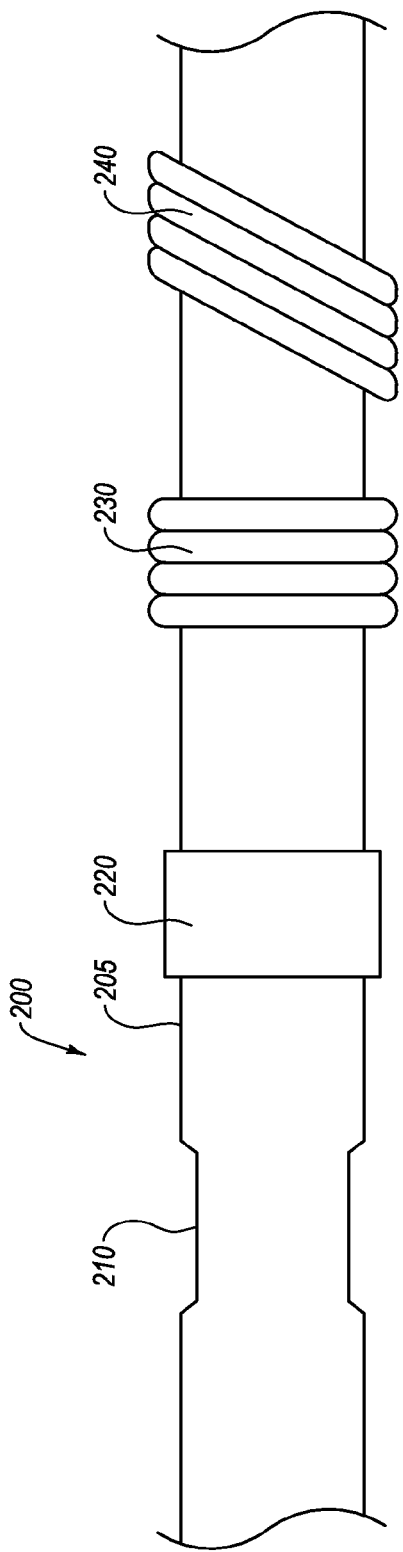
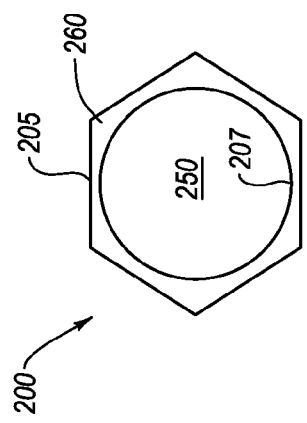

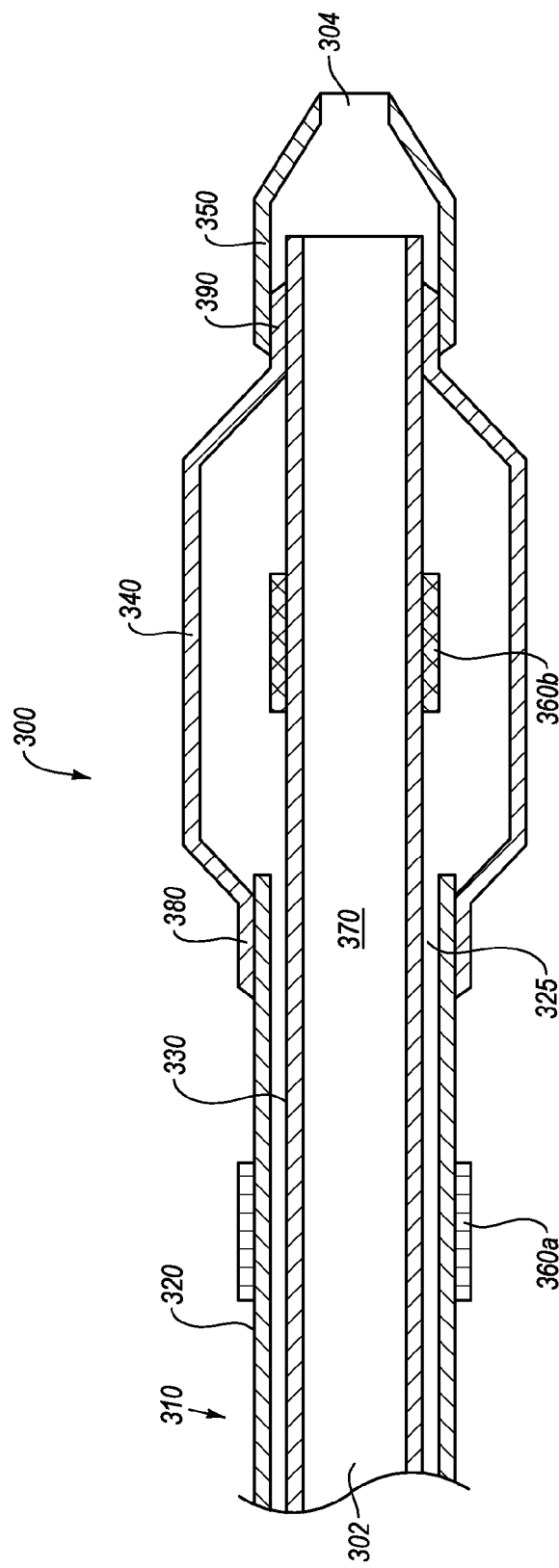

METHODS FOR MANUFACTURING A CATHETER USING AN ALUMINUM NITRIDE BONDING APPARATUS

BACKGROUND OF THE INVENTION

1. The Field of the Invention

The present invention relates to devices and methods for manufacturing medical thermoplastic catheter devices that are adapted for insertion into the body.

2. The Relevant Technology

A catheter is a tube that can be inserted into a body cavity, duct, or vessel. Catheters thereby allow drainage, administration of fluids or gases, access by surgical instruments, delivery of medical devices (e.g., stents), and the like. Medical vascular catheters are particularly designed for insertion into the vasculature and are available for a wide variety of purposes, including diagnosis, interventional therapy, drug delivery, drainage, perfusion, and the like. Medical vascular catheters for each of these purposes can be introduced to numerous target sites within a patient's body by guiding the catheter through an incision made in the patient's skin and a blood vessel and then through the vascular system to the target site. Since it can be difficult to steer many types of catheters, guide wires are often used to help position the catheter.

A medical catheter can be a relatively simple tube that is inserted into a patient's body during a medical procedure or it can be a complicated device that is itself configured to perform a variety of interventional medical procedures. The catheter body may be relatively straight, or may inherently curve, or may be curved by insertion of a curved stiffening wire or guide wire through the catheter lumen. The catheter body and catheter side wall are typically fabricated and dimensioned to minimize the catheter body outer diameter and side wall thickness, and to maximize the catheter lumen diameter while retaining sufficient side wall flexibility and strength characteristics to enable the catheter to be used for the intended medical purpose.

Medical vascular catheters are specifically adapted to be inserted into a patient's vasculature. One type of medical vascular catheter is a so-called "balloon catheter." A balloon catheter is an elongate tubular member that typically includes an inner tubular member that extends from the proximal end to the distal end, a balloon sealed to the distal end of the inner tubular member, an outer tubular member disposed over the inner tube and sealed to the proximal end of the balloon, and, optionally, a soft, atraumatic tip attached to the distal end of the balloon. The balloon catheter may also include one or more radiopaque markers that allow the progress of the catheter to be tracked in the body with the use of fluoroscopy. The balloon is typically inflated by delivering a pressurized gas or fluid to the balloon through the lumen between the inner and outer tubular members.

One example of a therapeutic procedure performed with a medical vascular catheter is known as percutaneous transluminal coronary angioplasty ("PTCA"). PTCA can be used, for example, to reduce arterial build-up of cholesterol fats or atherosclerotic plaque. In PTCA, a guide wire is typically inserted into the vicinity of a target treatment site in an artery (e.g., a coronary artery). The guide wire can then be used to guide a catheter, such as a balloon catheter, to the treatment site. Inflation of the balloon catheter at the treatment site can be used to compress plaque deposits against the walls of the artery and/or to expand a stent against the walls of the artery, thereby improving or restoring blood flow through the artery.

In order to allow the catheter to traverse the patient's vasculature, facilitate treatment, and prevent additional trauma to the patient, catheters typically need to have a number different sections (e.g., balloon sections, stiffer sections, and more flexible sections) formed from different materials. It should also be noted that in order to allow the catheter to traverse the patient's vasculature, facilitate treatment, and prevent additional trauma to the patient, catheters typically need to be quite small. An inner diameter of about 0.5 mm to 1.5 mm and an outer diameter of about 1 to 3 mm is typical for balloon catheters. Catheters for mitral valve replacement are some of the larger catheters in current use, with an outer diameter in a range from about 6-7 mm.

Such catheters are typically manufactured by "dry fitting" the various sections together, securing a heat-shrink material around the dry fitted sections to temporarily secure the joints, welding the joints together using heat and/or irradiation (e.g., laser irradiation), and finally removing the heat-shrink material from the joint sections. Such methods are complicated and time consuming. Because the material sections used to assemble a catheter are typically quite small and delicate, "dry fitting" the parts together and applying heat-shrink material can be complicated and time consuming. Likewise, using the current state of the art, it is difficult to control the amount of heat yielded by irradiation to weld the various sections together without damaging the tubing parts. As a result, the current state of the art is prone to yield poor uniformity of the welds. The process of removing heat-shrink material is also time-consuming and difficult and, as a result, catheters can be damaged in the process of removing the heat-shrink material, leading to waste.

BRIEF SUMMARY

The present disclosure describes apparatuses and methods for joining one or more tubing sections together to form a tubular catheter device, for shaping/reshaping one or more tubular sections of a catheter device, and/or for fusing elements (e.g., a radiopaque marker) onto a portion, such as, but not limited to, an external portion, of the catheter. In order to facilitate delivery of a catheter into a treatment site, a catheter may include several sections to yield different flexibilities, textures, radiopacity, and the like. Each section of the catheter (e.g., an inner tubular member, an outer tubular member, a radiopaque marker band, and a balloon section of a balloon catheter) is typically fabricated independently from the other sections. Subsequently, the separate sections are fused together to form the catheter.

The methods described herein allow the various sections of the catheter to be fitted together for fabrication without the use of heat-shrink tubing. The fitted parts are clamped in a die or mold at a temperature at or near room temperature; the die is then rapidly heated to fuse the parts (e.g., in about 2 seconds), rapidly cooled back down to a temperature at or about room temperature (e.g., in about 4 seconds), and removed from the die. The apparatuses and methods described herein can also be used to readily reshape portions of a catheter device to, for example, attach a tungsten radiopaque marker band to the catheter device, change the diameter of the one or more sections of the catheter, alter the flexibility of one or more portions of the catheter, apply a texture to the catheter tubing, and the like.

In one embodiment, a method includes (1) positioning at least one section of a tubular catheter in a heater apparatus, (2) clamping the at least one section of the tubular catheter in the heater apparatus at a temperature at or near room-temperature, (3) rapidly heating the heater apparatus with the at least one section of the tubular catheter clamped therein to a selected temperature sufficient to at least partially melt at least a portion of the at least one section of the tubular catheter, (4) rapidly cooling the heater apparatus with the at least one section of the tubular catheter clamped therein to a temperature at or near room-temperature, and (5) unclamping the at least one section of the tubular catheter from the heater apparatus and removing the at least one section of the tubular catheter therefrom. In one embodiment, the tubular catheter is a medical device such as, but not limited to, a medical catheter, a tubular catheter having a tungsten marker, a tubular catheter having an inflatable balloon section, and/or a tubular catheter having a shaped section.

In another embodiment, a method for manufacturing a tubular catheter device that includes one or more thermoplastic members is disclosed. The method includes (1) positioning at least one section of a tubular catheter in an aluminum nitride heater apparatus, (2) clamping the at least one section of the tubular catheter in the aluminum nitride heater apparatus at a temperature at or near room-temperature, (3) rapidly heating the aluminum nitride heater apparatus with the at least one section of the tubular catheter clamped therein to a selected temperature sufficient to at least partially melt at least a portion of the clamped article, (4) rapidly cooling the aluminum nitride heater apparatus with the at least one section of the tubular catheter clamped therein to a temperature at or near room-temperature, and (5) unclamping the at least one section of the tubular catheter from the aluminum nitride heater apparatus and removing the at least one section of the tubular catheter therefrom.

In yet another embodiment, a method for manufacturing a catheter that includes one or more tubular thermoplastic members. The method includes (1) positioning first and second tubular catheter sections of the tubular catheter on a mandrel, (2) overlapping a first end of a first tubular catheter portion over a first end of a second tubular catheter portion to form a first joint, (3) positioning the first joint in an aluminum nitride heater apparatus, wherein the aluminum nitride heater apparatus is arranged with a separable jaw-like clamping element coupled to an aluminum nitride heating element to permit the first and second tubular catheter portions to be positioned therein, (4) closing the separable jaw-like clamping element to clamp the first joint in the aluminum nitride heater apparatus at a temperature at or near room-temperature, (5) rapidly heating the aluminum nitride heater apparatus with the first joint clamped therein to a first temperature sufficient to couple the first and second tubular catheter portions together, (6) rapidly cooling the heater apparatus to a temperature at or near room-temperature, (7) opening the separable jaw-like clamping element of the heater apparatus to unclamp the fused the first and second tubular catheter portions, and (8) removing the coupled first and second catheter portions from the aluminum nitride heater apparatus.

In one embodiment, the heater apparatus defined in relation to the methods described herein includes a sintered ceramic body having a thermal conductivity of about 150 Watts per meter Kelvin ("W/m·K") to about 210 W/m·K or, preferably, at least about 190 W/m·K. In one embodiment, the heater apparatus includes an aluminum nitride heating element. Aluminum nitride is notable due to its relatively high thermal conductivity for an electrical insulating ceramic (i.e., about 70 W/m·K to about 210 W/m·K).

The methods described above can be adapted for one or more of reshaping a portion of an article or fusing two portions of an article to one another. For example, the methods can be used to form a ring section, a spiral section, a necked section, or a prefold section on at least a portion of a thermoplastic article. Likewise, the methods can be used to weld two sections of a thermoplastic article together such as, but not limited to, joining a balloon section to a distal end section of a tubular catheter.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1A illustrates a cross-sectional view of an elongate tubular member showing a number of joints that can be used to join sections of a tubular member;

FIG. 1B illustrates a close-up view of a lap-type joint that can be used to join sections of a tubular member;

FIG. 2A illustrates an elongate tubular member showing a number of heat formed sections that can be formed in a tubular member according to embodiments of the present invention;

FIG. 2B illustrates an cut-away end view of a section of a tubular member heat formed shape that can facilitate folding;

FIG. 3 illustrates a cross-sectional view of a balloon catheter fabricated according to one embodiment of the present invention;

DETAILED DESCRIPTION

I. Introduction

Figure 4:
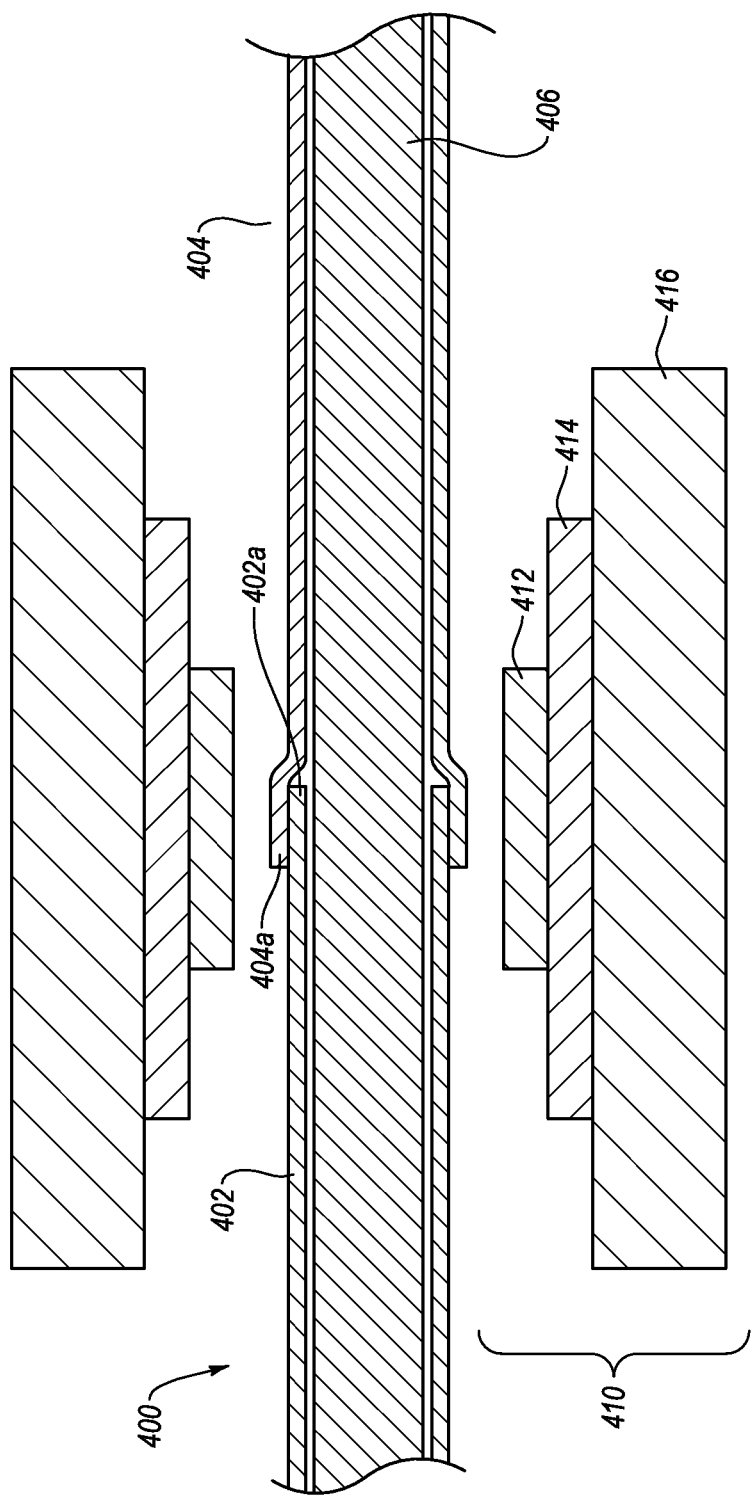
FIG. 4 illustrates a cross-sectional view of an elongate tubular member and an aluminum nitride heat forming apparatus that can be used to form a lap joint to join two sections of the tubular member.

The present disclosure describes apparatuses and methods for joining one or more tubing sections together to form a tubular catheter device, for shaping/reshaping one or more tubular sections of a catheter device, and/or for fusing elements (e.g., a radiopaque marker) onto a portion, such as, but not limited to, an external portion, of the catheter. In order to facilitate delivery of a catheter into a treatment site, a catheter may include several sections to yield different flexibilities, textures, radiopacity, and the like. Each section of the catheter (e.g., an inner tubular member, an outer tubular member, a radiopaque marker band, and a balloon section of a balloon catheter) is typically fabricated independently from the other sections. Subsequently, the separate sections are fused together to form the catheter.

The methods described herein allow the various sections of the catheter to be fitted together for fabrication without the use of heat-shrink tubing. The fitted parts are clamped in a die or mold at a temperature at or near room temperature; the die is then rapidly heated to fuse the parts (e.g., in about 2 seconds), rapidly cooled back down to a temperature at or about room temperature (e.g., in about 4 seconds), and removed from the die. The apparatuses and methods described herein can also be used to readily reshape portions of a catheter device to, for example, attach a tungsten radiopaque marker band to the catheter device, change the diameter of the one or more sections of the catheter, alter the flexibility of one or more portions of the catheter, apply a texture to the catheter tubing, and the like.

II. Catheters

In one embodiment, a medical catheter can be a tube-like member that is inserted into a patient's body during a medical procedure. For example, a catheter can be used to hold an incision into a blood vessel open and provide access to the vessel for other medical instruments. The catheter body may be relatively straight, or may inherently curve, or may be curved by insertion of a curved stiffening wire or guide wire through the catheter lumen. Many types of catheters are available and adapted for specific medical uses. For example, placement of a catheter into a particular part of the body may allow draining urine from the bladder, administration of intravenous fluids, medication, or parenteral nutrition with a peripheral venous catheter, direct measurement of blood pressure in an artery or vein, angioplasty, angiography, balloon septostomy, balloon sinuplasty, cardiac electrophysiology testing, catheter ablation, and the like.

Medical vascular catheters are specifically adapted to be inserted into a patient's vasculature. One type of medical vascular catheter is a so-called "balloon catheter." A balloon catheter is an elongate tubular member that typically includes an inner tubular member that extends from the proximal end to the distal end, a balloon sealed to the distal end of the inner tubular member, an outer tubular member disposed over the inner tube and sealed to the proximal end of the balloon, and, optionally, a soft, atraumatic tip attached to the distal end of the balloon. The balloon catheter may also include one or more radiopaque markers that allow the progress of the catheter to be tracked in the body with the use of fluoroscopy. The balloon is typically inflated by delivering a pressurized gas or fluid to the balloon through the lumen between the inner and outer tubular members.

A range of polymers are used for the construction of catheters, including silicone rubber, latex, and thermoplastic polymers (e.g., thermoplastic elastomers). Silicone is one of the most common choices because it is inert and unreactive to body fluids and a range of medical fluids with which it might come into contact. Thermoplastic polymers are also quite common because they are generally chemically inert, they are available in a wide variety of flexibilities, and sections of thermoplastic tubing can readily be reformed and/or welded with the use of heat.

Thermoplastic polymers that can be used to form medical devices include, but are not limited to, polyurethane, ethylene-vinyl acetate (EVA), fluoroplastics (PTFE, alongside with FEP, PFA, CTFE, ECTFE, ETFE), polyacrylates (acrylic), polyamide (PA or nylon), polyamide-imide (PAI), polyaryletherketone (PAEK or ketone), polybutadiene (PBD), polybutylene (PB), polybutylene terephthalate (PBT), polycaprolactone (PCL), polychlorotrifluoroethylene (PCTFE), polyethylene terephthalate (PET), polyester, polyethylene (PE), polyether block amide, polyetheretherketone (PEEK), polyetherketoneketone (PEKK), polyetherimide (PEI), polyethersulfone (PES), polyimide (PI), polypropylene (PP), polystyrene (PS), polyvinyl chloride (PVC), and polyvinylidene chloride (PVDC). Thermoplastic polymers that can be used in the production of medical catheter tubes include, but are not limited to, Pebax® (i.e., polyether block amide), polyamide, polyurethane, polyethylene, and PVC.

Referring now to FIG. 1A, a cross-sectional view of a portion of an example catheter 100 is illustrated. The catheter 100 is fabricated from a number of tubular sections 130, 140, 150, and 160 that are joined together with a number of example joint types 170, 180, and 190.

The catheter 100 may be fabricated from a thermoplastic polymer tubing. The thermoplastic polymer tubing defines an outer surface 110, and inner surface 115, and an interior lumen 120. The tubular sections 130, 140, 150, and 160 may be fabricated from one type of thermoplastic polymer tubing or the sections 130, 140, 150, and 160 may be fabricated from a combination of different thermoplastic polymers in order to tailor the properties (e.g., flexibility and pushability) of the catheter 100. As shown on FIG. 1A, the catheter 100 includes four different tubing sections 130, 140, 150, and 160. However, catheters may contain more or fewer sections depending on the application and desired performance characteristics of the catheter 100.

FIG. 1A illustrates a number of joints 170, 180, and 190 that can be used to join sections of thermoplastic tubing. For example, joint 170 illustrates one example of a joint that is formed using the methods and apparatuses described herein by inserting the end of tube section 140 into the end of tube section 130. The joint 170 is then sealed by fusing or welding tube sections 130 and 140 together in the overlap area 172. The junction at joint 170 can be smoothed by heat forming the joint area, thereby facilitating passage of the catheter through a patient's vasculature.

FIG. 1B illustrates a lap joint 170a, which is a variation of joint 170. Lap joint 170a is formed by making complementary cut outs 132 and 142 on tubing sections 130 and 140, respectively, and fitting the complementary ends 132 and 142 together. Joint 170a is then sealed by fusing or welding the complementary tube sections 132 and 142 together in the overlap area. In some embodiments, a joint like 170a may be desirable because the junction 170a at the interior surface 115 and exterior surface 110 is smooth. Moreover, because there is no change on the thickness of the tubing at the joint 170a, there should be little or no abrupt change in the flexibility of the catheter at a joint like 170a.

Joint 180 is another example of a joint that can be formed using the methods and apparatuses described herein. Joint 180 is formed by inserting the complementary ends of tubing sections 140 and 150 into an exterior collar 185. The joint 180 is formed by fusing or welding the exterior collar 185 to the exterior surface 110 of tubing sections 140 and 150. As with joint 170, the opposing ends of tubing sections 140 and 150 and the collar 185 at joint 180 can be smoothed by heat forming the joint area to present a smooth profile between the collar 185 and the adjacent tubing portions 140 and 150, thereby facilitating passage of the catheter through a patient's vasculature.

Joint 190 is yet another example of a joint that can be formed using the methods and apparatuses described herein. Joint 190 is similar to joint 180 except the joint is formed by inserting the complementary ends of tubing sections 150 and 160 into an interior collar 195. The joint 190 is formed by fusing or welding the interior collar 195 to the interior surface 115 of tubing sections 150 and 160. In contrast to joints 170 and 180, there is no overlap area or collar on the outside surface 110 of the catheter 100 that can interfere with the catheter's passage through the patient's vasculature. However, due to the heat and pressure applied to the outside of the catheter 100 during the fusing/welding process, the interior collar 195 can be smoothed to some extent against the interior surface 115 of the catheter.

Referring now to FIGS. 2A and 2B, several textures and features 210, 220, 230, 240, and 260 that can be applied to the exterior surface 205 of a catheter 200 are illustrated. For example, a necked section (i.e., a reduced diameter section) is illustrated at 210. One or more necked sections 210 can be formed on the exterior surface 205 of a catheter 200 to alter either one or both of the exterior diameter or the flexibility of the catheter 200.

In another example, 220 shows a band or collar that is added to the exterior surface 205 of the catheter 200. As was discussed in reference to FIG. 1A, an exterior collar 205 can be used to form a joint that joins two tubular sections. In addition, an exterior collar 220 can be added to a catheter 200 to cause local stiffening of the catheter 200.

In a another embodiment, the exterior collar 220 can be configured as a radiopaque band that allows the catheter 200 to be tracked inside a patient's body using fluoroscopy. For example, the exterior collar 220 can be a polymeric band (e.g., a polyethylene band) impregnated with a radiopaque metal such as tungsten. As with the joint sections described in FIG. 1A, the transitions between the exterior collar 220 and the catheter 200 can be smoothed by heat forming the exterior collar 220 while fusing the collar 220 to the catheter.

In yet another example, textures that can be applied to the exterior surface 205 of the catheter 200 using the methods and apparatuses described herein are illustrated at 230, 240, and 260. Texture 230 is a series of rings and texture 240 is a series of spirals. Textures 230 and 240 and similar textures can, for example, be applied to the exterior surface 205 of a catheter 200 to alter the flexibility or pushability of the catheter 200.

FIG. 2B is an end view of a section of the tubular catheter 200 that illustrates texture 260. The end view illustrates the exterior surface 205, the interior surface 207, and the interior lumen 250 of the catheter 200. The texture schematically illustrated at 260 in FIG. 2B or a similar texture could, for example, be applied to the exterior surface 205 of a balloon section of a balloon catheter to facilitate folding of the balloon by creating areas with different thicknesses and, thus, different flexibilities.

Referring now to FIG. 3, a cut away view of a balloon catheter 300 is illustrated. The balloon catheter 300 is a specific example of a type of catheter that is commonly used and that can be fabricated using the methods and apparatuses described herein.

The balloon catheter 300 illustrated in FIG. 3 is an elongate tubular member that includes a proximal end 302 and a distal end 304. The elongate tubular member of the balloon catheter 300 defines an outer surface 310 and an interior lumen 370. The balloon catheter 300 includes an inner tubular member 330 that extends from the proximal end 302 to the distal end 304, a balloon 340 sealed at 390 to the distal end of the inner tubular member 330, an outer tubular member 320 disposed over the inner tube 330 and sealed at 380 to the proximal end of the balloon 340, and, optionally, a soft, atraumatic tip 350 attached to the distal end of the balloon 340 and the inner tube 330. Because the balloon 340 is sealed to the outer tube 320 at its proximal end at 380 and to the inner tube 330 at its distal end at 390 the balloon can be inflated by a pressurized gas or fluid. The balloon catheter 300 may also include one or more radiopaque markers 360a and 360b that allow the progress of the balloon catheter 300 to be tracked in the body with the use of fluoroscopy. In some embodiments, the soft, atraumatic tip 350 may also be configured as a radiopaque marker.

For delivery to a treatment site, the balloon 340 is typically folded into a compact shape. To facilitate folding, the balloon 340 can be heat formed with a texture similar to the texture illustrated in FIG. 2B. Once the balloon catheter 300 is delivered to a treatment site within the body, the balloon 340 is typically inflated by delivering a pressurized gas or fluid to the balloon 340 through the lumen 325 between the inner tubular member 330 and the outer tubular member 320.

The balloon catheter illustrated in FIG. 3 is a relatively simple balloon catheter and the description of the catheter and its manufacture are merely illustrative. Catheters, in general, and balloon catheters, in particular, can be very complex devices. For example, catheters in use today can include multiple interior lumens, multiple balloons, complex arrangements of guide wire lumens, lumens for auxiliary wires (e.g., wires for monitoring blood pressure), and the like. The apparatuses and methods described herein can be adapted, by those having skill in the art, for fabricating complex catheters.

IV. Apparatuses for Fabricating a Catheter

As explained in greater detail below, the catheters described herein can be fabricated by fusing together sections of thermoplastic tubing using the apparatuses described herein. Likewise, sections of the catheters described in the present application can be shaped using the apparatuses described herein. For example, the balloon catheter 300 illustrated in FIG. 3 may be fabricated by (1) fusing or welding the balloon 340 and the optional radiopaque marker 360a to the outer tubular member 320, (2) fusing the optional radiopaque marker 360b to the inner tubular member 330, (3) disposing the inner tubular member inside the outer tubular member, and (4) sealing the balloon 340 to the inner tubular member 330 and the soft, atraumatic tip 350 at 390.

Referring now to FIGS. 4-9, cross sectional views of various apparatuses that can be used to fuse and/or shape a number of catheter sections are illustrated. For example, FIG. 4 illustrates a cross-sectional view of an aluminum nitride heater apparatus 410 that can be used to fuse a first section 402 and a second section 404 of a tubular member 400. The aluminum nitride heater apparatus includes an effector element 412, an aluminum nitride heater element 414, and a heat sink 416.

The aluminum nitride heater apparatus 410 is configured such that the tubular element 400 can be clamped in the aluminum nitride heater apparatus 410, the apparatus can be rapidly heated to a temperature sufficient to fuse the first and second tubular sections 402 and 404, the apparatus can then be rapidly cooled to nearly room temperature and the fused tubular member can be removed. It is important to note that the heat up and cool down steps can be accomplished with the aluminum nitride heater apparatus 410 rapidly enough that the desired elements are properly fused without damaging the tubular sections or degrading the overall integrity of the tubular sections.

Aluminum nitride is a ceramic material with an unusually high rate of thermal conductivity for an insulating ceramic. For example, sintered aluminum nitride bodies have a thermal conductivity ranging from about 140 W/m·K to about 210 W/m·K, about 150 W/m·K to about 200 W/m·K, or about 170 W/m·K to about 190 W/m·K. An aluminum nitride heater element can be fabricated by pressing at least two layers of aluminum nitride powder into a mold with metal traces (e.g., tungsten traces) between the layers. The compressed powder and the metal traces are then heated to a high temperature to fuse the aluminum nitride. The metal traces conduct electricity to heat the aluminum nitride heater element.

Aluminum nitride heaters are commercially available from a number of manufacturers. For example, Oasis Materials Corporation of Poway, Calif. is a manufacturer of high-quality aluminum nitride heater elements that can be used in the apparatuses described herein. Commercially available aluminum nitride heater apparatuses can be manufactured in a number of widths with internal tungsten metallization and have a power density of up to 1500 W/in$^2$ (about 233 W/cm$^2$) and a thermal conductivity of about 190 W/m·K.

The effector element 412 is configured to apply a clamping force to the catheter part disposed in the aluminum nitride heater apparatus 410. In addition, the effector element 412 is configured to transfer heat from the heater element 414 as rapidly as possible and to cool as rapidly as possible after the heater apparatus 410 has heated the tubing to a temperature sufficient to fuse the tubing elements together.

In addition to choosing a material for the effector element 412 that has a sufficiently high thermal transfer rate, the effector element 412 also needs to be carefully joined to the aluminum nitride heater element 414 to permit rapid heat transfer between the effector element 412 and the heater element 414. The effector element 412 also needs to have a surface preparation/finish that contacts the parts (e.g., tubular elements 402 and 404) such that the surface finish of the fused article meets design criteria. Likewise, the material used to fabricate the effector element 412 must be shapeable so that the "mold cavity" of the heater apparatus 410. For example, the surface finish of the fused part may need to be smooth or textured, depending on design criteria. The effector element 412 must also be sufficiently durable so that the effector element 412 does not erode over time, resulting in alteration of the dimensions of the fused article. This is particularly the case due to the small and delicate nature of the articles being fabricated in the heater apparatus 410. In one embodiment, it may be possible to omit the effector element 412 and use a shaped heater element 414 instead.

A number of metals and metal alloys have thermal conductivities that are high enough for the design criteria of the heater apparatus 410. A number of such metals are listed below in Table 1. Stainless steel is included for comparison.

TABLE 1

| Material | Thermal conductivity |
|---|---|
| Beryllium copper | ~210 W/m · K |
| Aluminum, pure | ~240 W/m · K |
| Copper, pure | ~370 W/m · K |
| Gold, pure | ~315 W/m · K |
| Silver, pure | ~420 W/m · K |
| Steel, stainless | ~20 W/m · K |

Gold, silver, and copper have exceptional high thermal conductivities, but they are not generally durable enough and, in the case of gold and silver, they are much too expensive. Likewise, aluminum has a high thermal conductivity, but it is also not durable enough. In contrast, beryllium copper has a thermal conductivity that is almost as good as aluminum but it is much more durable. Beryllium copper, also known as copper beryllium, BeCu or beryllium bronze, is a metal alloy that includes of copper and 0.5 to 3% beryllium. Beryllium copper occasionally contains additionally alloying elements such as cobalt. Beryllium copper can be molded, forged, and/or machined to have almost any shape.

Beryllium copper alloy can be cold worked and age hardened to increase its strength. In the fully heat treated and cold worked condition beryllium copper is the hardest (Vicker's hardness (HV) of about 100-420) and strongest (tensile strength of about 410-1400 N/mm$^2$) of any copper alloy. It is similar in mechanical properties to many high strength alloy steels but, compared to steels, it has better corrosion resistance and higher thermal conductivity (e.g., up about 210 W/m·K).

The material used to fabricate the heat sink is selected such that it rapidly dissipates heat to cool the heater apparatus 410. For example, beryllium copper, aluminum, copper, or another material may be selected for its thermal dissipation properties. The heat sink 416 can be either air cooled or liquid cooled. In the case of a liquid cooled heat sink, cooling can be turned on/off by switching the flow of a coolant medium. In the case of an air cooled heat sink, cooling can either be passive or the heat sink can be actively cooled by blowing air over the heat sink. The thermal interface between the heat sink 416 and heater 412/effector element 412 is important for system performance. Improper design of the heat sink can impede performance during heating cycle; thermal mass and undesired passive cooling effects are important for system performance.

In order to form a joint between the first section 402 and a second section 404 of a tubular member 400, the sections 402 and 404 are assembled on a mandrel 406 and, as shown in the illustrated embodiment, the end 404a of the second section 404 is disposed over the complementary end 402a of the first section. The assembled parts are then arranged in the heater apparatus 410 and the heater apparatus 410 is clamped around the assembled tubular member 400. The heater 414 is then activated and rapidly heated to a temperature for a period of time sufficient to fuse the tubular sections 402 and 404 together to form a joint. After heating, the heater apparatus is rapidly cooled and the fused tubular member is removed 400 from the apparatus 410.

For example, the heater apparatus 410 can be configured to heat up from a temperature at or near room-temperature to of at least about 120° C. in less than about 2 seconds and the heating apparatus 410 can be configured for cooling from at least about 120° C. to at or near room temperature in less than about 4 seconds. In another example, the heater apparatus 410 can be configured to heat up from a temperature at or near room-temperature to of at least about 120° C. in less than about 1.5 seconds and the heating apparatus 410 can be configured for cooling from at least about 120° C. to at or near room temperature in less than about 3 seconds.

Figure 5:
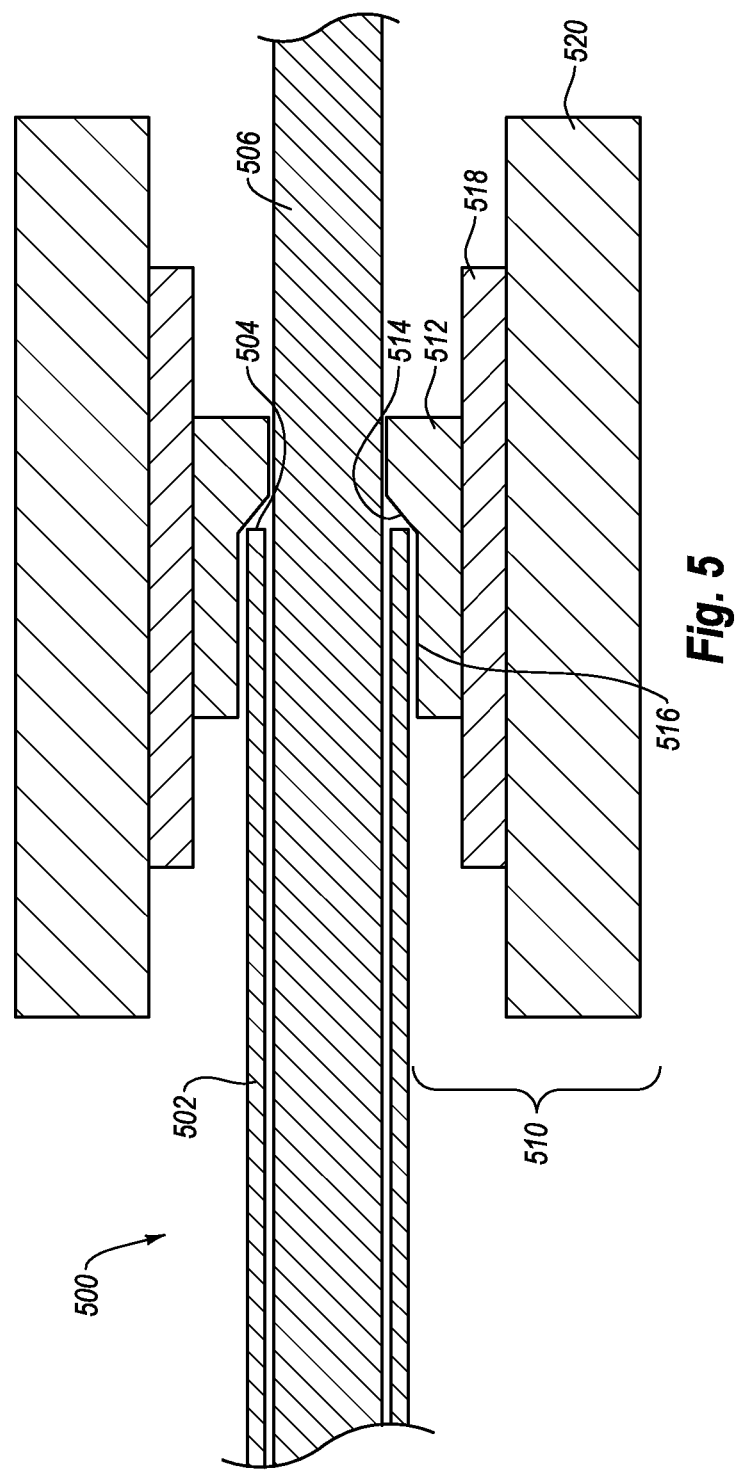
FIG. 5 illustrates a cross-sectional view of an elongate tubular member and an aluminum nitride heat forming apparatus that can be used to shape an end section of the tubular member.

Referring now to FIG. 5, another embodiment of a heater apparatus 510 is illustrated. The heater apparatus 510 can, for example, be used to shape or "neck" an end 504 of a thermoplastic tube 502. The heater apparatus 510 includes an end effector 512, and aluminum nitride heater element 518, and a heat sink 520. In the illustrated embodiment, the end effector 512 includes a substantially flat shaping surface 516 and a tapered shaping surface 514. When the assembled tubular member 500 is clamped in the heater apparatus 510 and heated, the end effector 512 is configured such that it can reduce the outer diameter and taper the end 504 of the tube 502.

Figure 6:
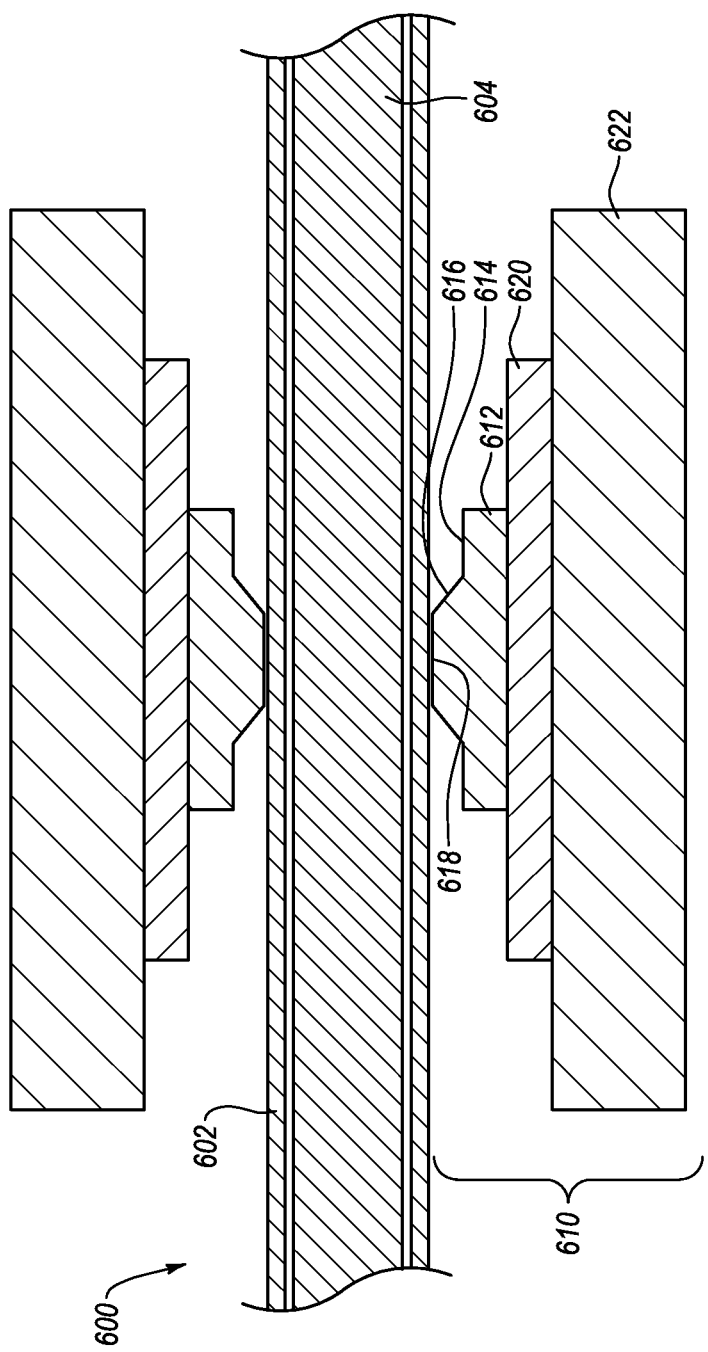
FIG. 6 illustrates a cross-sectional view of an elongate tubular member and an aluminum nitride heat forming apparatus that can be used to shape and intermediate section of the tubular member.

Referring now to FIG. 6, yet another embodiment of a heater apparatus 610 is illustrated. The heater apparatus 610 can, for example, be used to shape or "neck" an intermediate portion of a thermoplastic tube 602. As in the previous examples, the heater apparatus 610 includes an effector element 612, and aluminum nitride heater element 620, and a heat sink 622. In the illustrated embodiment, the effector element 612 includes a substantially flat shaping surfaces 614 and 618 and a tapered shaping surface 616. When the assembled tubular member 600 (i.e., the thermoplastic tube 602 and the inner mandrel 604) is clamped in the heater apparatus 610 and heated, the effector element 612 is sized and configured such that it can reduce the outer diameter of the intermediate section of the tube 602, producing a necked section.

Figure 7:
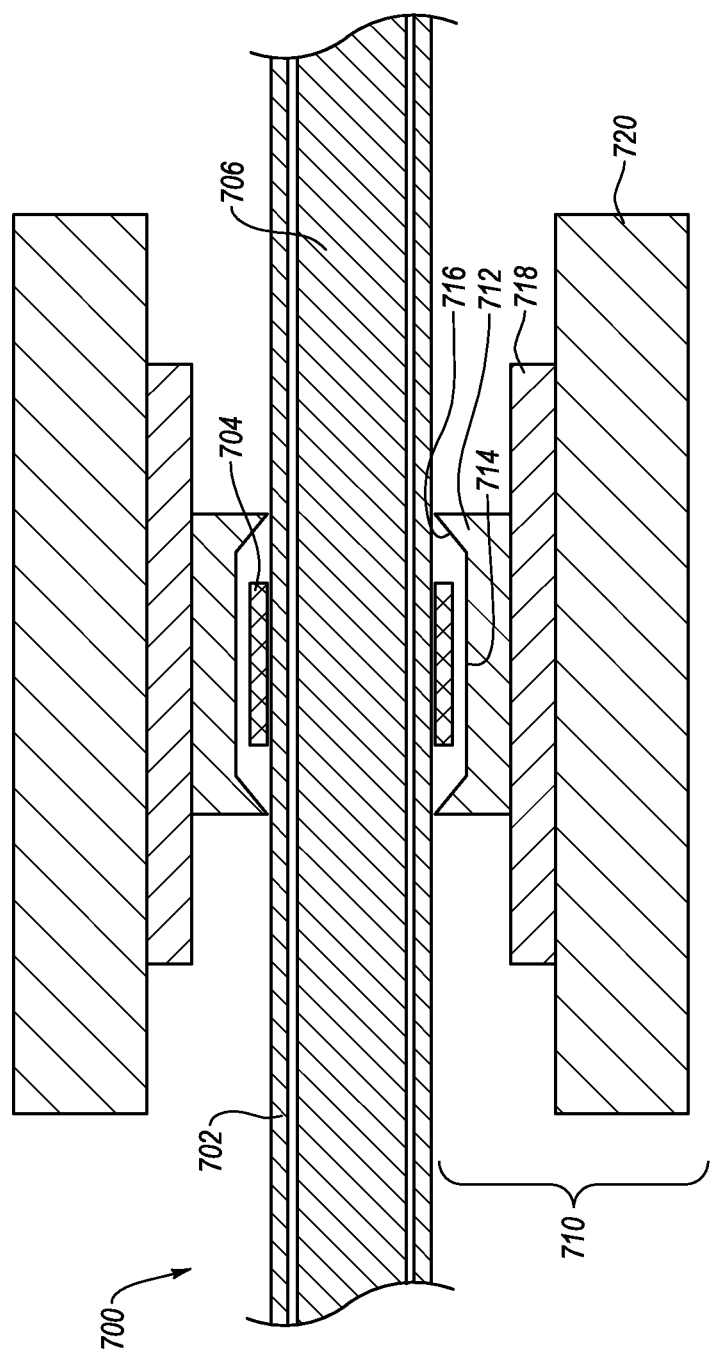
FIG. 7 illustrates a cross-sectional view of an elongate tubular member and an aluminum nitride heat forming apparatus that can be used to join a collar section to the tubular member.

Referring now to FIG. 7, still yet another embodiment of a heater apparatus 710 is illustrated. The heater apparatus 710 can, for example, be used to bond a band 604, such as a radiopaque band or a band used to form a joint like joint 180 in FIG. 1A, to the thermoplastic tube 602. As in the previous examples, the heater apparatus 710 includes an effector element 712, and aluminum nitride heater element 718, and a heat sink 720. In the illustrated embodiment, the effector element 712 includes a substantially flat shaping surface 714 and a tapered shaping surface 716. When the assembled tubular member 700 (i.e., the thermoplastic tube 702, the band 704, and the inner mandrel 706) is clamped in the heater apparatus 710 and heated, the effector element 712 is sized and configured such that it can bond the band 704 to the tube 702 and taper the ends of the band.

Figure 8:
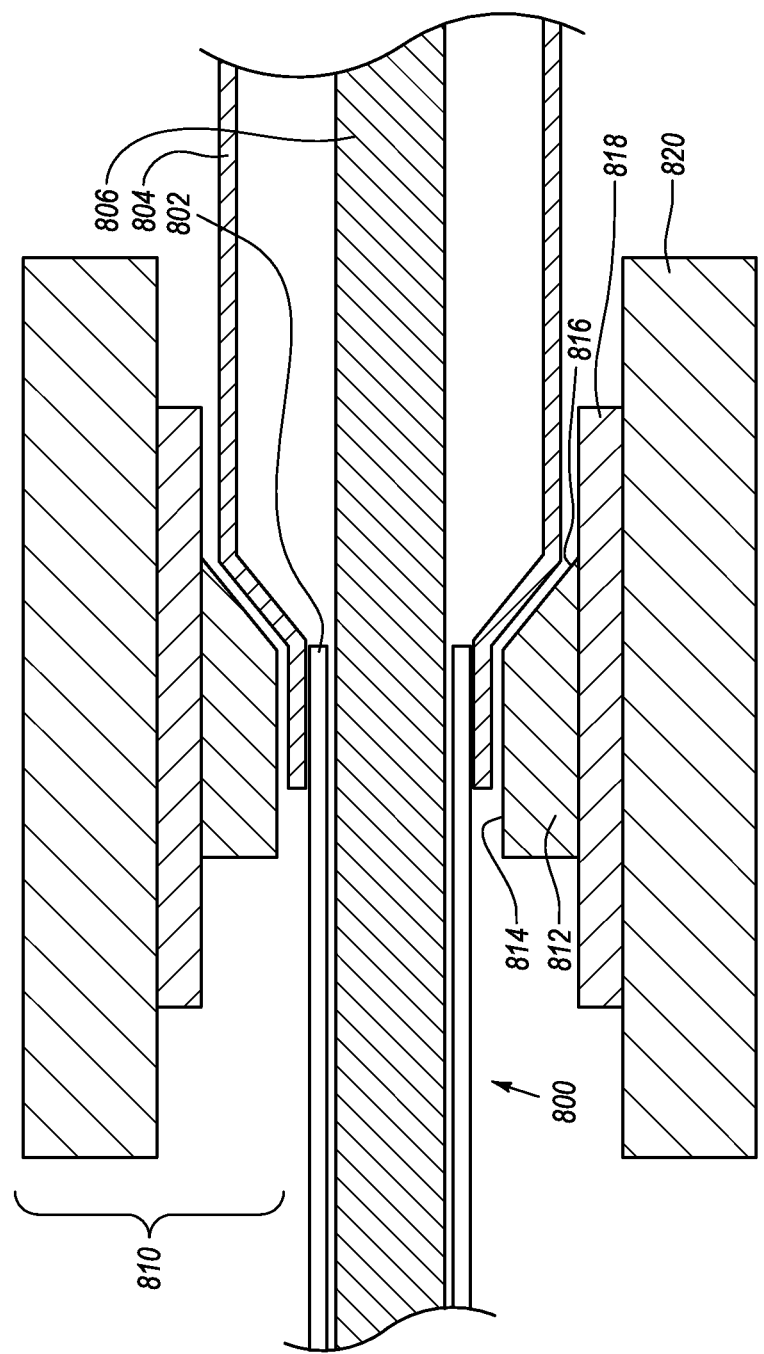
FIG. 8 illustrates a cross-sectional view of an elongate tubular member and an aluminum nitride heat forming apparatus that can be used to couple the proximal end of a balloon section to the tubular member.

Referring now to FIG. 8, an embodiment of a heater apparatus 810 that is specifically adapted to bond the proximal section of a balloon 804 to the outer tubular member 802 of a balloon catheter is illustrated. As in the previous examples, the heater apparatus 810 includes an effector element 812, and aluminum nitride heater element 818, and a heat sink 820. In the illustrated embodiment, the effector element 812 includes a substantially flat shaping surface 814 and a tapered shaping surface 816 that is configured to accommodate the tapered shape of a balloon 704. When the assembled tubular member 800 (i.e., the thermoplastic tube 802, the balloon 804, and the inner mandrel 804) is clamped in the heater apparatus 810 and heated, the effector element 812 is sized and configured such that it can bond the balloon 804 to the distal end of the outer tubular member 802. In one embodiment, the effector element 812 can be configured such that tapered shaping surface 816 is not conductive to heat or less conductive to heat than the substantially flat shaping surface 814 such that the balloon 804 is not affected in the bonding process.

Figure 9:
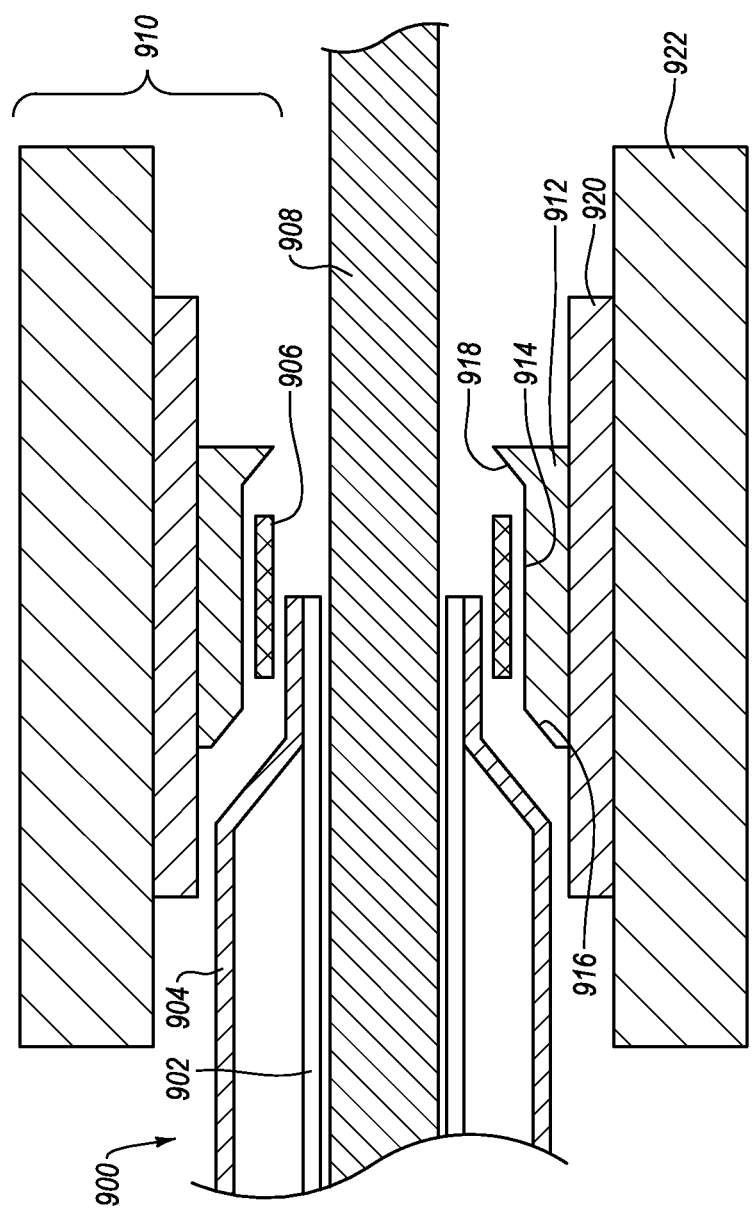
FIG. 9 illustrates a cross-sectional view of an elongate tubular member and an aluminum nitride heat forming apparatus that can be used to couple the distal end of a balloon section and a distal tip to the tubular member.

Referring now to FIG. 9, an embodiment of a heater apparatus 910 that is specifically adapted to bond the distal section of a balloon 804 and a soft distal tip to the distal end of the outer tubular member 902 of a balloon catheter is illustrated. As in the previous examples, the heater apparatus 910 includes an effector element 912, and aluminum nitride heater element 920, and a heat sink 922. In the illustrated embodiment, the effector element 912 includes a substantially flat shaping surface 914 and a tapered shaping surfaces 916 and 918 that are configured to accommodate the tapered shape of a balloon 804. When the assembled tubular member 900 (i.e., the thermoplastic tube 902, the balloon 804, the soft distal tip 906, and the inner mandrel 808) is clamped in the heater apparatus 910 and heated, the effector element 912 is sized and configured such that it can bond the balloon 804 and the soft distal tip 906 to the distal end of the outer tubular member 902. In one embodiment, the effector element 912 can be configured such that tapered shaping surfaces 816 and 818 are not conductive to heat or less conductive to heat than the substantially flat shaping surface 914 such that the balloon 804 is not affected in the bonding process.

IV. Methods for Fabricating a Catheter

The aluminum nitride heater apparatuses described herein can be used to fabricate catheters that include one or more thermoplastic tubular members that are bonded together to form the catheter. Likewise, the aluminum nitride heater apparatuses described herein can be used to fuse a variety of element to a catheter body (e.g., a radiopaque marker) and/or to modify the shape and/or flexibility of a catheter.

In one embodiment, a method for fabrication a tubular catheter includes (1) positioning at least one section of a tubular catheter in a heater apparatus, (2) clamping the at least one section of the tubular catheter in the heater apparatus at a temperature at or near room-temperature, (3) rapidly heating the heater apparatus with the at least one section of the tubular catheter clamped therein to a selected temperature sufficient to at least partially melt at least a portion of the at least one section of the tubular catheter, (4) rapidly cooling the heater apparatus with the at least one section of the tubular catheter clamped therein to a temperature at or near room-temperature, and (5) unclamping the at least one section of the tubular catheter from the heater apparatus and removing the at least one section of the tubular catheter therefrom.

In one embodiment, the heater apparatus includes a sintered ceramic body having a thermal conductivity of about 150 W/m·K to about 210 W/m·K or, preferably, at least about 190 W/m·K. In another embodiment, the heater apparatus includes an aluminum nitride heating element. Aluminum nitride is notable due to its relative high thermal conductivity (i.e., about 70 W/m·K to about 210 W/m·K) for an electrically insulating ceramic.

In one embodiment, the heater apparatus is configured to be separated into a first section and a second section. For example, the heater apparatus can be arranged with a separable jaw-like clamping element coupled to the aluminum nitride heating element. The jaw-like clamping element can be pivoted about an axis to an open and closed position to permit first and second tubular catheter portions to be positioned within the heater apparatus, clamped therein, and subsequently removed. The heater apparatus further includes a heat sink linked to a first face of each section the aluminum nitride heating element and an effector element linked to a second, opposite face of each section the aluminum nitride heating element. The heater apparatus is also sized and configured such that the effector elements of the heater apparatus can apply a clamping force to the article and to transmit heat from the aluminum nitride heating element to fuse adjacent tubular sections together and/or to reshape the catheter when a catheter section is positioned in the heater for heat forming.

The heater apparatus is configured such that is can heat a thermoplastic article that is disposed on the heater apparatus to a selected temperature sufficient to bond two or more sections of thermoplastic tubing together and/of heat form a section of thermoplastic tubing. In one embodiment, the selected temperature is in a range from about 100° C. to about 300° C., about 105° C. to about 175° C., or about 110° C. to about 120° C.

In one embodiment, the heater apparatus is configured such that the thermoplastic article can be clamped in the apparatus at or near room-temperature, heated to a temperature sufficient to bond or reshape the article, and then rapidly cooled back to a temperature at or near room temperature before opening the apparatus to remove the article. It is important to note that the heat up and cool down steps can be accomplished with the aluminum nitride heater apparatus rapidly enough that the desired elements are properly fused together without damaging the tubular sections or degrading the overall integrity of the tubular sections.

For example, the heater apparatus can be configured to heat up from a temperature at or near room-temperature to a first temperature selected to at least partially melt or reform at least a portion of the at least one section of the tubular catheter (e.g., at least about 120° C.) in less than about 2 seconds and the heating apparatus can be configured for cooling from the first temperature to at or near room temperature in less than about 4 seconds. In another example, the heater apparatus can be configured to heat up from a temperature at or near room-temperature to a first temperature selected to at least partially melt or reform at least a portion of the at least one section of the tubular catheter in less than about 1.5 seconds and the heating apparatus 410 can be configured for cooling from the first temperature to at or near room temperature in less than about 3 seconds.

In another embodiment, a method for manufacturing a tubular catheter device that includes one or more thermoplastic members is disclosed. The method includes (1) positioning at least one section of a tubular catheter in an aluminum nitride heater apparatus, (2) clamping the at least one section of the tubular catheter in the aluminum nitride heater apparatus at a temperature at or near room-temperature, (3) rapidly heating the aluminum nitride heater apparatus with the at least one section of the tubular catheter clamped therein to a selected temperature sufficient to at least partially melt at least a portion of the clamped article, (4) rapidly cooling the aluminum nitride heater apparatus with the at least one section of the tubular catheter clamped therein to a temperature at or near room-temperature, and (5) unclamping the at least one section of the tubular catheter from the aluminum nitride heater apparatus and removing the at least one section of the tubular catheter therefrom.

In yet another embodiment, a method for manufacturing a catheter that includes one or more tubular thermoplastic members. The method includes (1) positioning first and second tubular catheter sections of the tubular catheter on a mandrel, (2) overlapping a first end of a first tubular catheter portion over a first end of a second tubular catheter portion to form a first joint, (3) positioning the first joint in an aluminum nitride heater apparatus, wherein the aluminum nitride heater apparatus is arranged with a separable jaw-like clamping element coupled to an aluminum nitride heating element to permit the first and second tubular catheter portions to be positioned therein, (4) closing the separable jaw-like clamping element to clamp the first joint in the aluminum nitride heater apparatus at a temperature at or near room-temperature, (5) rapidly heating the aluminum nitride heater apparatus with the first joint clamped therein to a first temperature sufficient to couple the first and second tubular catheter portions together, (6) rapidly cooling the heater apparatus to a temperature at or near room-temperature, (7) opening the separable jaw-like clamping element of the heater apparatus to unclamp the fused first and second tubular catheter portions, and (8) removing the coupled first and second catheter portions from the aluminum nitride heater apparatus.

The methods described above can be adapted for one or more of reshaping a portion of an article or fusing two portions of an article to one another. For example, the methods can be used to form a ring section, a spiral section, a necked section, or a prefold section on at least a portion of a thermoplastic article. Likewise, the methods can be used to weld two sections of a thermoplastic article together such as, but not limited to, joining a balloon section to a distal end section of a tubular catheter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    positioning at least one section of a tubular catheter in a heater apparatus and on a mandrel, the mandrel extending through the tubular catheter;
    clamping the at least one section of the tubular catheter to the mandrel in the heater apparatus while the heater apparatus is at a temperature at or near room-temperature;
    rapidly heating the heater apparatus from the temperature at or near room-temperature, with the at least one section of the tubular catheter clamped to the mandrel by a clamping force, to a selected temperature sufficient to at least partially melt or reform at least a portion of the at least one section of the tubular catheter, the rapid heating and the clamping force toward the mandrel fusing and/or reshaping the at least one section of the tubular catheter;
    rapidly cooling the heater apparatus with the at least one section of the tubular catheter clamped therein to a temperature at or near room-temperature; and
    unclamping the at least one section of the tubular catheter from the heater apparatus and removing the at least one section of the tubular catheter therefrom.

2. The method of claim 1, wherein the heater apparatus includes a sintered ceramic body having a thermal conductivity of at least about 150 W/m·K to about 200 W/m·K.

3. The method of claim 1, wherein the heater apparatus includes an aluminum nitride heating element.

4. The method of claim 3, wherein the heater apparatus includes a jaw-like clamping element coupled to the aluminum nitride heating element that is configured to separate the aluminum nitride heating element into a first section and a second section and wherein the aluminum nitride heating element further includes a heat sink linked to a first face of each section of the aluminum nitride heating element and first and second effector elements linked to each second, opposite face of the first and second sections of the aluminum nitride heating element.

5. The method of claim 4, wherein the effector elements are configured to apply the clamping force to the at least one section of the tubular catheter and to transmit heat from the aluminum nitride heating element.

6. The method of claim 4, wherein the effector element is configured to apply a clamping force to the at least one section of the tubular catheter and for transmitting heat from the aluminum nitride heating element to bond a first portion of the tubular catheter to a second portion of the tubular catheter.

7. The method of claim 1, wherein the selected temperature is in a range from about 100° C. to about 300° C.

8. The method of claim 1, wherein the selected temperature is in a range from about 105° C. to about 175° C.

9. The method of claim 1, wherein the selected temperature is in a range from about 110° C. to about 120° C.

10. The method of claim 1, wherein the heating apparatus is configured for heating from the temperature at or near room-temperature to a first temperature selected to at least partially melt or reform at least a portion of the at least one section of the tubular catheter in less than about 2 seconds and the heating apparatus is configured for cooling from the first temperature to at or near room temperature in less than about 4 seconds.

11. The method of claim 1, wherein the heating apparatus is configured for heating from the temperature at or near room-temperature to a first temperature selected to at least partially melt or reform at least a portion of the at least one section of the tubular catheter in less than about 1.5 seconds and the heating apparatus is configured for cooling from the first temperature to at or near room temperature in less than about 3 seconds.

12. The method of claim 1, wherein the at least one section of the tubular catheter comprises a thermoplastic material.

13. A method for manufacturing a tubular catheter device that includes one or more thermoplastic members, the method comprising:
    positioning at least one section of a tubular catheter in an aluminum nitride heater apparatus and on a mandrel, the mandrel extending through the tubular catheter;
    clamping the at least one section of the tubular catheter to the mandrel in the aluminum nitride heater apparatus while the heater apparatus is at a temperature at or near room-temperature;
    rapidly heating the aluminum nitride heater apparatus from the temperature at or near room-temperature, with the at least one section of the tubular catheter clamped to the mandrel by a clamping force, to a selected temperature sufficient to at least partially melt at least a portion of the clamped at least one section of the tubular catheter, the rapid heating and the clamping force toward the mandrel fusing and/or reshaping the at least one section of the tubular catheter;
    rapidly cooling the aluminum nitride heater apparatus with the at least one section of the tubular catheter clamped therein to a temperature at or near room-temperature; and
    unclamping the at least one section of the tubular catheter from the aluminum nitride heater apparatus and removing the at least one section of the tubular catheter therefrom.

14. The method of claim 13, wherein the tubular catheter comprises at least one of a tubular catheter having a tungsten marker, a tubular catheter having an inflatable balloon section, or a tubular catheter having a shaped section.

15. The method of claim 13, wherein at least a portion of the at least one section of the tubular catheter is reshaped.

16. The method of claim 15, wherein the reshaping includes one or more of forming a ring section, a spiral section, or a prefold section on at least a portion of the at least one section of the tubular catheter.

17. The method of claim 15, wherein the reshaping includes one or more of reshaping a proximal end portion, a distal end portion, or a portion between the proximal end portion and the distal end portion.

18. The method of claim 17, wherein the reshaped portion has altered flexibility as compared to adjacent sections of the tubular catheter.

19. The method of claim 13, further comprising welding a first tubular catheter section to a second tubular catheter section to form a unitary tubular catheter section.

20. The method of claim 19, wherein the unitary tubular catheter section comprises at least a portion of the tubular catheter.

21. The method of claim 19, wherein the first tubular catheter section is an elongate member and the second tubular catheter section is a tungsten marker.

22. The method of claim 19, wherein the first tubular catheter section is an elongate member and the second tubular catheter section is an inflatable balloon member.

23. The method of claim 13, further comprising:
    positioning first and second tubular catheter sections of the tubular catheter on a mandrel;
    assembling the first and second tubular catheter sections of the tubular catheter by overlapping a first end of the first tubular catheter section with a first end of the second tubular catheter section;
    clamping the assembled first and second tubular catheter sections in the heater apparatus at a temperature at or near room-temperature;
    rapidly heating the heater apparatus a selected temperature sufficient to weld the first and second tubular catheter sections together;
    cooling the heater apparatus to a temperature at or near room-temperature;
    unclamping the heater apparatus and removing the welded first and second tubular catheter sections therefrom.

24. A method for manufacturing a catheter that includes one or more tubular thermoplastic members, the method comprising:
    positioning first and second tubular catheter sections of the tubular catheter on a mandrel;
    overlapping a first end of a first tubular catheter portion over a first end of a second tubular catheter portion to form a first joint;
    positioning the first joint in an aluminum nitride heater apparatus, wherein the aluminum nitride heater apparatus is arranged with a separable jaw-like clamping element coupled to an aluminum nitride heating element to permit the first and second tubular catheter portions to be positioned therein;
    closing the separable jaw-like clamping element to clamp the first joint in the aluminum nitride heater apparatus at a temperature at or near room-temperature;
    rapidly heating the aluminum nitride heater apparatus with the first joint clamped therein to a first temperature sufficient to couple the first and second tubular catheter portions together;
    rapidly cooling the heater apparatus to a temperature at or near room-temperature;
    opening the separable jaw-like clamping element of the heater apparatus to unclamp the fused the first and second tubular catheter portions; and
    removing the coupled first and second catheter portions from the aluminum nitride heater apparatus.

25. The method of claim 24, wherein the heater apparatus includes a jaw-like clamping element coupled to the aluminum nitride heating element that is configured to separate the aluminum nitride heating element into a first section and a second section and wherein the aluminum nitride heating element further includes a heat sink linked to a first face of each section the aluminum nitride heating element and first and second effector elements linked to each second, opposite face of first and second sections the aluminum nitride heating element.

26. The method of claim 25, wherein the effector elements are configured to apply a clamping force to the article and to transmit heat from the aluminum nitride heating element to fuse and/or reshape the at least one section of the tubular catheter.

27. The method of claim 24, wherein the aluminum nitride heater apparatus is configured for heating the first and second tubular catheter sections from a temperature at or near room-temperature to the first temperature sufficient to couple the first and second tubular catheter portions together in less than about 2 seconds and for cooling the first and second tubular catheter sections from the first temperature to at or near room temperature in less than about 4 seconds.

28. The method of claim 24, wherein the aluminum nitride heater apparatus is configured for heating the first and second tubular catheter sections from the temperature at or near room-temperature to the first temperature sufficient to couple the first and second tubular catheter portions together in less than about 1.5 seconds and for cooling the first and second tubular catheter sections from the first temperature to at or near room temperature in less than about 3 seconds.

\* \* \* \* \*